United States Patent
Keese et al.

(10) Patent No.: US 7,272,978 B2
(45) Date of Patent: Sep. 25, 2007

(54) MAGNETIC-INDUCTIVE FLOW METER WITH AN ELECTRICALLY ISOLATED MEASURING TUBE

(75) Inventors: Dieter Keese, Wahlsburg (DE); Klaus Schaefer, Hannoversch Muenden (DE); Rainer Strutzberg, Dransfeld (DE)

(73) Assignee: ABB Patent GmbH, Ladenburg (DE)

( * ) Notice: Subject to any disclaimer, the term of this patent is extended or adjusted under 35 U.S.C. 154(b) by 37 days.

(21) Appl. No.: 11/288,473

(22) Filed: Nov. 29, 2005

(65) Prior Publication Data

US 2006/0150746 A1 Jul. 13, 2006

(30) Foreign Application Priority Data

Nov. 30, 2004 (DE) .................. 10 2004 057 696

(51) Int. Cl.
*G01F 1/58* (2006.01)
(52) U.S. Cl. .................................. 73/861.12
(58) Field of Classification Search ............ 73/861.17, 73/861.11, 861.12, 861.14
See application file for complete search history.

(56) References Cited

U.S. PATENT DOCUMENTS

| 4,279,166 A | * | 7/1981 | Gryn et al. | ............... 73/861.12 |
| 5,852,247 A | * | 12/1998 | Batey | ...................... 73/861.17 |
| 6,983,661 B2 | * | 1/2006 | Zingg | ...................... 73/861.12 |

* cited by examiner

*Primary Examiner*—Jewel Thompson
(74) *Attorney, Agent, or Firm*—Michael M. Rickin

(57) ABSTRACT

A magnetic-inductive flow meter with a measuring tube, which can be fitted into a pipeline system by using flange portions at the ends, with at least two measuring electrodes that are fitted into the wall of the measuring tube opposite each other in an electrically isolated manner and are intended for sensing a measuring voltage, a magnet unit, which is likewise arranged on the outside of the measuring tube, generating a magnetic field that is aligned substantially perpendicularly in relation to the direction of flow of the conductive flow medium to be measured, and the measuring tube being provided on the inside with means for the electric isolation of the measuring electrodes from the measuring tube, the means for the electric isolation taking the form of a thin inner coating of the measuring tube, the layer thickness of which lies in the range of 0.1-500 μm.

13 Claims, 1 Drawing Sheet

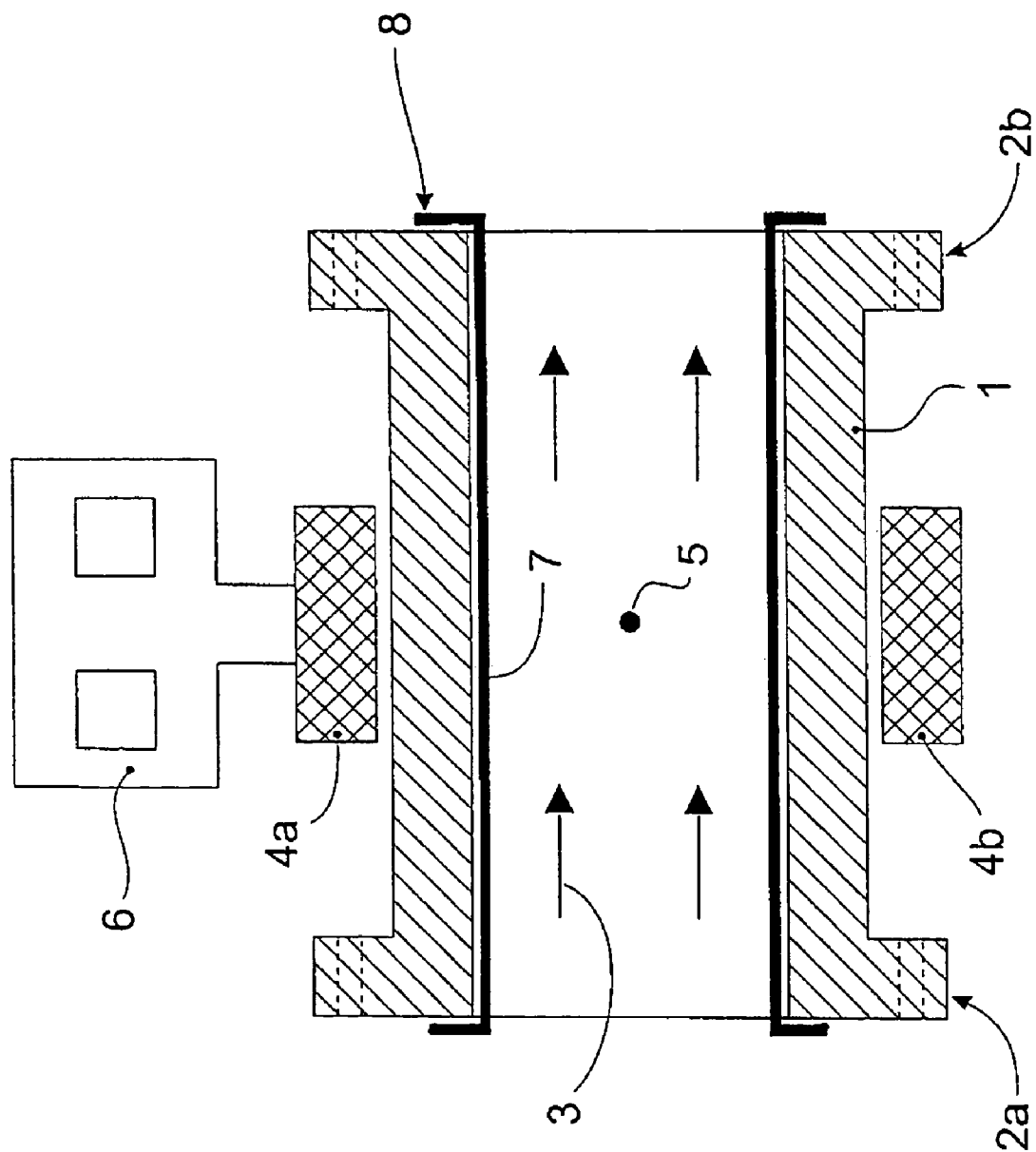

MAGNETIC-INDUCTIVE FLOW METER WITH AN ELECTRICALLY ISOLATED MEASURING TUBE

FIELD OF THE INVENTION

The present invention relates to a magnetic-inductive flow meter and more particularly to the electrical isolation of the measuring electrodes from the measuring tube of the flow meter.

DESCRIPTION OF THE PRIOR ART

A magnetic-inductive flow meter is preferably used as a flow meter for liquids, slurries and pastes which have a specific minimum electrical conductivity. This type of flow meter is distinguished by quite accurate measuring results, without any pressure loss being caused in the pipeline system by the measurement. Furthermore, magnetic-inductive flow meters do not have any movable components or components protruding into the measuring tube, which are particularly liable to wear. The area of use of the flow meter of interest here extends primarily to applications in the chemical industry, pharmaceuticals and the cosmetics industry as well as communal water and waste-water management and the food industry.

Faraday's law of induction forms the physical basis for the measuring method of a magnetic-inductive flow meter. This natural law states that a voltage is induced in a conductor moving in a magnetic field. When this natural law is exploited in measuring technology, the electrically conductive medium flows through a measuring tube in which a magnetic field is generated perpendicularly in relation to the direction of flow. The voltage induced in the medium is picked up by an arrangement of electrodes. Since the measuring voltage obtained in this way is proportional to the average flow rate of the flowing medium, the volumetric flow of the medium can be determined from this. Taking the density of the flowing medium into account, its mass flow can be ascertained.

EP 0 869 336 A2 discloses a magnetic-inductive flow meter of the generic type. Its arrangement of electrodes interacts with two opposite solenoids, which generate the required magnetic field perpendicularly in relation to the direction of flow in the measuring tube. Within this magnetic field, each volume element of the flowing medium moving through the magnetic field, with the field strength that is present in this volume element, makes a contribution to the measuring voltage picked up by means of the measuring electrodes. The measuring voltage is fed to the input side of downstream evaluation electronics. Within the evaluation electronics, firstly a signal amplification takes place by means of an electronic differential amplifier, the differential amplifier operating here with respect to the reference potential, which usually corresponds to ground potential. On the basis of the measuring voltage, the evaluation electronics produce a value for the volumetric flow of the medium flowing through the measuring tube.

If it consists of a conductive material, the measuring tube of such a magnetic-inductive flow meter is usually lined with a hollow-cylindrical body consisting of a non-conductive material. The lining primarily serves for the electric isolation of the measuring electrodes extending through the wall of the measuring tube with respect to the conductive measuring tube. So-called liners, that is thin-walled plastic tubes that are drawn into the usually metallic measuring tube, are usually used in practice as the lining.

A disadvantage of this technical solution is that the production step of drawing the plastic tube into the measuring tube is quite complex. In order for this to work at all, the plastic tube to be drawn in must have a certain minimum wall thickness of more than 1 mm, in order to ensure dimensionally stable insertion of the plastic tube into the measuring tube. Furthermore, the plastic tube must be closely toleranced in its dimensions with respect to the measuring tube, in order that the plastic tube comes to bear against the inner wall of the measuring tube as free from play as possible.

It is therefore the object of the present invention to further improve a magnetic-inductive flow meter of the type described above to the extent that the means for electric isolation required inside the measuring tube can be easily produced.

The present invention is a magnetic-inductive flow meter comprising;

a measuring tube comprising a wall, an inside and flange portions at each end of said tube and at least two measuring electrodes that are fitted into said wall of said measuring tube opposite each other in an electrically isolated manner, said at least two measuring electrodes for sensing a measuring voltage, a magnet unit arranged on the outside of said measuring tube, said magnet unit generating a magnetic field that is aligned substantially perpendicularly in relation to the direction of flow of a conductive flow medium to be measured through said measuring tube; and an inner coating on said measuring tube inside for the electric isolation of said measuring electrodes from said measuring tube, said inner coating having a layer thickness in the range of 0.1-500 μm.

The present invention is also a method for producing a magnetic-inductive flow meter, said flow meter comprising:

a measuring tube comprising a wall, an inside and flange portions at each end of said tube and at least two measuring electrodes that are fitted into said wall of said measuring tube opposite each other in an electrically isolated manner, said at least two measuring electrodes for sensing a measuring voltage; and a magnet unit arranged on the outside of said measuring tube, said magnet unit generating a magnetic field that is aligned substantially Perpendicularly in relation to the direction of flow of a conductive flow medium to be measured through said measuring tube; providing an electrically isolating inner coating on said measuring tube inside for the electric isolation of said measuring electrodes from said measuring tube, said inner coating having a layer thickness which lies in the range of 0.1-500 μm.

The invention includes the technical teaching that the means for the electric isolation of the measuring tube take the form of a thin inner coating of the measuring tube, the layer thickness of which lies in the range of 0.1-500 μm.

The advantage of the solution according to the invention is that an inner coating can be realized more easily in production engineering terms than the previously customary lining. Tests have shown that an inner coating with the desired electric isolating properties can be realized for example by sputtering or vapor-depositing an electrically isolating material on the measuring tube. Alternatively, an effectively electrically isolating inner coating can also be applied by spraying electrically isolating ceramic and/or lacquer materials onto the inside of the measuring tube. Spraying the inner coating with an electrically isolating plastic—such as PTFE or PEEK—is also possible.

In this way, the solution according to the invention departs from the previously customary liner technique and takes a new approach. To do so, it was necessary to overcome the preconceived idea that such a thin-walled coating would not be capable of ensuring the desired electric isolating properties in continuous operation of the magnetic-inductive flow meter.

A further advantage of the solution according to the invention is that the small thickness of the inner coating according to the invention allows a corresponding material saving to be achieved. Furthermore, the inner coating according to the invention of the measuring tube serves not only for electric isolation but at the same time also for corrosion protection of the measuring tube.

According to a further measure improving the invention, it is provided that the electrically isolating inner coating extends beyond the inner region of the measuring tube at least also to the region of the flange portions. In this way, the inner coating according to the invention can be extended—in particular for the purpose of better corrosion protection—also to external functional elements—such as housing parts and process connections—of the magnetic-inductive flow meter.

Within the scope of the present invention, the inner coating is suitable in particular in connection with a measuring tube which consists of a metal. Metallic measuring tubes of magnetic-inductive flow meters preferably consist of steel, titanium, tantalum, platinum-iridium or alloys thereof or of a lightweight metal. The inner coating according to the invention serves in this case in particular for electric isolation. However, it is also conceivable to produce the measuring tube from a pressure-resistant plastic, the inner coating according to the invention serving here primarily as corrosion protection with respect to aggressive media.

Further measures improving the invention are described in more detail below together with the description of a preferred exemplary embodiment of the invention on the basis of the single figure. The figure shows a schematic longitudinal section through a magnetic-inductive flow meter.

DESCRIPTION OF THE DRAWING

The only drawing FIGURE shows a schematic longitudinal section through a magnetic-inductive flow meter embodied in accordance with the present invention.

DETAILED DESCRIPTION

According to the FIGURE, the magnetic-inductive flow meter has a measuring tube 1, which can be fitted into a pipeline—not represented any further here—by using flange portions 2a and 2b at the ends and is connected by screws to said pipeline using corresponding flange portions. The measuring tube 1 is flowed through by a flowable flow medium 3. To conform to the magnetic-inductive flow measuring principle, the flow medium 3 has at least slight electrical conductivity. Also provided, on the outside of the measuring tube 1, is a magnet unit 4a, 4b, which comprises magnets lying opposite each other and serves for generating a magnetic field extending perpendicularly in relation to the axis of the measuring tube. The magnet unit 4a, 4b corresponds with two measuring electrodes 5 arranged lying opposite each other on the measuring tube (of which only one measuring electrode can be seen in this sectional representation). The measuring electrodes 5 are aligned perpendicularly in relation to the axis of the magnetic field and serve for measuring measuring voltage induced as a consequence of the flow of the flow medium 3. The measuring signal is fed to a downstream electronics unit 6, which serves as an electrical interface with further signal-processing devices.

In the case of this exemplary embodiment, the measuring tube 1 consists of an electrically conductive metal. In order to create an electric isolation with respect to the measuring electrodes 5 penetrating through the measuring tube 1 and also with respect to the flow medium 3, the measuring tube has a thin inner coating 7, the layer thickness of which lies in the range of 0.1-500 μm.

This inner coating 7 is realized here by vapor-depositing a suitable electrically isolating material. This results in a solid, integral bond of the inner coating 7 to the measuring tube 1.

However, here the electrically isolating inner coating 7 does not just extend along the hollow-cylindrical inner region of the measuring tube 1. Rather, the inner coating 7 also extends in the region of the flange portions 2a and 2b on both sides into radially outwardly extending edge regions 8, in order in particular to ensure corrosion protection at this location.

What is claimed is:

1. A magnetic-inductive flow meter comprising:
   a measuring tube comprising a wall, an inside and flange portions at each end of said tube and at least two measuring electrodes that are fitted into said wall of said measuring tube opposite each other in an electrically isolated manner, said at least two measuring electrodes for sensing a measuring voltage,
   a magnet unit arranged on the outside of said measuring tube, said magnet unit generating a magnetic field that is aligned substantially perpendicularly in relation to the direction of flow of a conductive flow medium to be measured through said measuring tube; and
   an inner coating on said measuring tube inside for the electric isolation of said measuring electrodes from said measuring tube, said inner coating having a layer thickness in the range of 0.1-500 μm.

2. The magnetic-inductive flow meter as claimed in claim 1, wherein the electrically isolating inner coating extends beyond the inner region of the measuring tube at least to the region of the flange portions.

3. The magnetic-inductive flow meter as claimed in claim 2, wherein the inner coating is applied in an integrally bonding manner by sputtering or vapor-depositing electrically isolating material on the measuring tube.

4. The magnetic-inductive flow meter as claimed in claim 2, wherein the inner coating is applied by spraying electrically isolating ceramic and/or lacquer materials on the measuring tube.

5. The magnetic-inductive flow meter as claimed in claim 2, wherein the inner coating is applied by spraying electrically isolating plastic PTFE or PEEK on the measuring tube.

6. The magnetic-inductive flow meter as claimed in claim 1, wherein the inner coating is applied in an integrally bonding manner by sputtering or vapor-depositing electrically isolating material on the measuring tube.

7. The magnetic-inductive flow meter as claimed in claim 1, wherein the inner coating is applied by spraying electrically isolating ceramic and/or lacquer materials on the measuring tube.

8. The magnetic-inductive flow meter as claimed in claim 1, wherein the inner coating is applied by spraying electrically isolating plastic PTFE or PEEK on the measuring tube.

9. The magnetic-inductive flow meter as claimed in claim 1, wherein the measuring tube consists of a pressure-resistant plastic.

10. The magnetic-inductive flow meter as claimed in claim 1, wherein the measuring tube consists of a metal.

11. The magnetic-inductive flow meter as claimed in claim 10, wherein the metal measuring tube consists of steel, titanium, tantalum, platinum-iridium or alloys thereof or of a lightweight metal.

12. A method for producing a magnetic-inductive flow meter, said flow meter comprising:

a measuring tube comprising a wall, an inside and flange portions at each end of said tube and at least two measuring electrodes that are fitted into said wall of said measuring tube opposite each other in an electrically isolated manner, said at least two measuring electrodes for sensing a measuring voltage; and a magnet unit arranged on the outside of said measuring tube, said magnet unit generating a magnetic field that is aligned substantially perpendicularly in relation to the direction of flow of a conductive flow medium to be measured through said measuring tube;

providing an electrically isolating inner coating on said measuring tube inside for the electric isolation of said measuring electrodes from said measuring tube, said inner coating having a layer thickness which lies in the range of 0.1-500 µm.

13. The method of claim 12 further comprising providing said electrically isolating inner coating either by spraying, sputtering or vapor-depositing.

* * * * *